Figure 1:
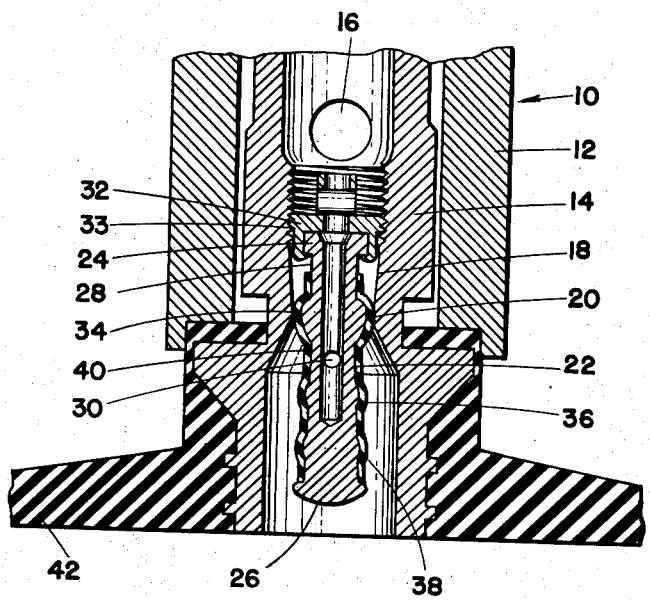

Jan. 1, 1952

J. T. MYERS 2,580,455

AIR VALVE

Filed Jan. 5, 1946

Inventor
JOE T. MYERS

By M. O. Hayes

Attorney

Patented Jan. 1, 1952

2,580,455

UNITED STATES PATENT OFFICE 2,580,455

AIR VALVE

Joe Thomas Myers, United States Navy

Application January 5, 1946, Serial No. 639,396

2 Claims. (Cl. 251—122)

(Granted under the act of March 3, 1883, as amended April 30, 1928; 370 O. G. 757)

This invention relates to valves of the inflation stem type; and in particular, to a valve the stem of which is covered by a rubber jacket which functions as a check to prevent the reverse flow of air or other gas passing therethrough.

Rubber jacketed valves of the inflation stem type have been known for many years. In general, the stems of these valves are straight sided and the rubber jacket, because of the stem construction either deforms or is blown off the stem so that the valve leaks or becomes entirely inoperative. These rubber jacketed, straight sided stem valves have also been found to become blocked with ice, particularly, carbon dioxide ice in cases where the carbon dioxide is expanded from a relatively high pressure to a low pressure through this type of valve. The valve of this invention is so constructed that the rubber jacket is positively held in place, is leak-proof and functions to seal the inlet ports in a progressive or undulating manner. The jacket cannot be blown off of the stem. The said progressive or undulating seal of the inlet ports by the rubber jacket, in the reverse direction, viz., the admission of gas from a high pressure source into a container at relatively low pressure, functions to prevent the fixed formation of ice above referred to. This action is produced by the gas flowing out of the transverse ports in the stem and traveling parallel to the surface of the stem until it strikes one of the flow shoulders (hereinafter described); at this point the gas is deflected outwards, causing the rubber jacket to bulge at this point. The same action takes place as the gas passes over the second flow shoulder. There is thus produced a progressive expansion and intervening contraction of the rubber jacket which operates to rid the mechanism of said ice formation.

With these defects in view, it is therefore an object of this invention to provide a high pressure valve of the inflation stem type which is leak-proof, and It is a further object of this invention to provide a rubber jacketed valve of the inflation stem type on which the rubber jacket is positively held in position, and It is an additional object of this invention to provide a rubber jacketed valve of the inflation stem type on which the rubber jacket operates as a progressive closure or seal of the inlet ports and also as a check against the reverse flow of gas having passed through the valve.

It is also an object of the invention to provide a rubber jacketed valve of the inflation stem type in which the undulatory movement of the rubber jacket caused by gas flow therethrough rids the mechanism of ice which tends to form therein by reason of the expansion of the gas in said gas flow.

It is another object of the invention to provide a rubber jacketed valve of the inflation stem type which is of sturdy construction and capable of ready and inexpensive manufacture.

Figure 2:
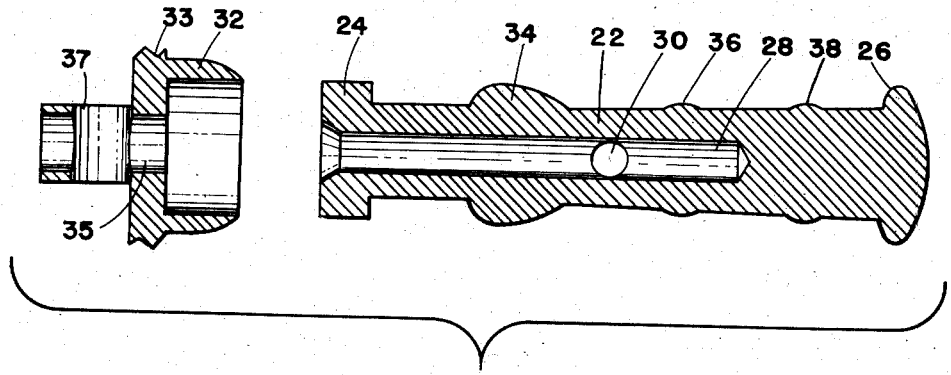

A preferred embodiment of this invention is shown in the accompanying drawings which are merely illustrative and in which;

Figure 1 is an enlarged vertical section through the valve stem and associated structure, and Figure 2 is an exploded longitudinal section through the valve stem and swivel head showing the detailed construction thereof.

In Figure 1 of the drawings, 10 represents generally the assembly of components comprising the inflator stem 12, the valve stem tube 14, the valve 22 of this invention and rubber flange 42 of the body to be inflated, in operative relationship. 16 represents the gas inlet port in the valve stem tube the interior diameter of which is reduced and threaded as at 18. This valve stem tube is provided with an annular shoulder 20 which functions as a seat for valve 22. The latter constitutes the subject of this invention. In particular, the valve comprises a stem and a swivel head or cap 32 which is mounted on the stem and is freely rotatable with respect thereto. The stem is bored longitudinally approximately three quarters of its length as at 28. Bore 28 is provided with outlet ports 30 which are positioned at approximately two thirds of the length of the stem from the head end. The stem is further provided with a head flange 24 and an end flange 26 which functions as a reforming shoulder which will be described later on. Positioned between flanges 24 and 26 are seating shoulder 34 and flow shoulders 36 and 38. The diameter of seating shoulder 34 is such that in conjunction with rubber jacket 40, a gas tight seal is formed with annular shoulder 20 in valve stem tube 14, when swivel head 32 is turned into position. In this seating combination rubber jacket 40 is firmly held in place. Positioned exteriorly of the stem of valve 22 and between flanges 24 and 26 is rubber jacket 40. This jacket fits snugly on the stem forming the above described gas tight seal and also permitting the high pressure inflation gas flowing out of the ports 30 to flow between it and the undulating surface of valve 22 and to pass thence into the body being inflated. By reason of the undulating surface of the valve a progressive sealing action takes place. Flange 26 functions to keep rubber jacket 40 in place and to prevent the jacket from being blown off the stem when subjected to heavy internal pressure. Rubber jacket 40, because of the positioning of flow shoulders 36 and 38 operates as a very efficient check against the reverse flow of the inflation gas from the inflated body. Shoulders 36 and 38 are of smaller diameter than seating shoulder 34 in order to permit readily the insertion and withdrawal of the valve with its rubber jacket from valve stem tube 14.

Rotatively mounted on flange 24 is swivel head 32. The latter is exteriorly threaded as at 33 to fit the threaded portion of valve stem tube 14. Head 32 is bored axially as at 35 and transversely as at 37 to provide ports of ample capacity for the ingress of gas under pressure.

The type of valve herein disclosed is particularly adapted as a check valve in the inflation system of self-inflating life preservers wherein carbon-dioxide is used as the inflating gas. But the valve has a wider application than this. It is peculiarly adapted to use as a check valve in the inflation stem of a rubber tire or inner tube or in any application between a high pressure source and a low pressure receiver. It will not rupture or be rendered inoperative by high pressures.

While a preferred embodiment of the invention has been described and illustrated by the accompanying drawings, it is not desired to be strictly limited thereto as modification in structure, such, for example, as the number of flow shoulders could be made without departing from the spirit or scope of the invention as defined by the herewith claims.

The invention described herein may be manufactured and used by or for the Government of the United States of America for governmental purposes without the payment of any royalties thereon or therefor.

I claim:

1. A valve of the inflation stem type adapted to be positioned in a valve stem tube to permit the flow of gas from a high pressure source connected to the valve stem tube and to act as a check on reverse gas flow, comprising a swivel headed elongated valve stem provided with an axially positioned gas inlet duct having an opening at the head end of the stem and extending to a point short of the discharge end, radial outlet ports intermediate the stem ends communicating with said duct, and at least one annular flow shoulder extending from the stem surface at a point intermediate the discharge ducts and the discharge stem end; an elastic jacket positioned closely on the valve stem to include the discharge ports and said shoulder; means at the head end of said jacket constructed and arranged to seal said jacket to the stem to prevent gas leakage, and means addditional to said shoulder for holding said jacket in place on said stem, whereby, as the gas flows from said high pressure source between the surface of said valve stem and said elastic jacket, the latter is caused to undulate over said flow shoulder and thereby prevent the fixed formation of ice in the valve mechanism.

2. A valve of the inflation stem type for use with a high pressure gas source, comprising an elongated stem having a head end and discharge end, and provided with a duct extending from the head end to a point short of the discharge end, communicating radial outlet ports positioned at a point intermediate the stem ends, and spaced annular shoulders extending from the stem surface in the area between the outlet ports and discharge end; an undulatable elastic jacket closely enclosing said stem to include said outlet ports and spaced shoulders; means additional to said shoulders and positioned on said stem adjacent the ends thereof for holding said jacket in place on said stem; and a swivel connection at the head end of said stem, whereby as gas flows from said high pressure source through said stem and radial outlet ports the said elastic jacket is caused to undulate over said annular shoulders and to thereby rid the valve mechanism of ice tending to form therein by reason of the expansion of said gas.

JOE THOMAS MYERS.

REFERENCES CITED

The following references are of record in the file of this patent:

UNITED STATES PATENTS

| Number | Name | Date |
|--------|------|------|
| 616,836 | Goss | Dec. 27, 1898 |
| 1,045,404 | Hottenroth | Nov. 26, 1912 |
| 2,347,988 | Burke | May 2, 1944 |

FOREIGN PATENTS

| Number | Country | Date |
|--------|---------|------|
| 18,763 | Great Britain | 1896 |
| 17,457 | Great Britain | July 24, 1897 |
| 17,338 | Great Britain | July 21, 1914 |